United States Patent [19]
Lancon

[11] Patent Number: 5,687,246
[45] Date of Patent: Nov. 11, 1997

[54] HEADPIECE OR HEADREST COMPRISING A PERSONAL PROXIMITY SOUND RIG

[76] Inventor: Paul Lancon, 11, Rue Antoine Lumiere, 69008 Lyons, France

[21] Appl. No.: 633,411

[22] Filed: Jun. 10, 1996

[51] Int. Cl.⁶ ........................................ H04R 25/00
[52] U.S. Cl. .................. 381/188; 381/154; 381/205; 181/141
[58] Field of Search ............................ 381/24, 86, 87, 381/88, 89, 90, 154, 182, 188, 205; 181/141, 199, 198; 455/347, 350

[56] References Cited

U.S. PATENT DOCUMENTS

| | | | |
|---|---|---|---|
| 4,038,499 | 7/1977 | Yeaple | 381/24 |
| 4,440,443 | 4/1984 | Nordskog. | |
| 4,490,842 | 12/1984 | Watanabe | 381/24 |
| 5,170,435 | 12/1992 | Rosen et al. | 381/90 |
| 5,218,175 | 6/1993 | Scarlata. | |

FOREIGN PATENT DOCUMENTS

| | | |
|---|---|---|
| B-1 142 448 | 1/1963 | Germany. |
| A-2 102 656 | 2/1983 | United Kingdom. |
| WO 93/01951 | 2/1993 | WIPO. |

*Primary Examiner*—Huyen D. Le
*Attorney, Agent, or Firm*—Oliff & Berridge

[57] ABSTRACT

Headpiece with a personal proximity sound rig, comprising a rigid support (2), a pad (20) mounted on the support, with a rest part for the rear of the head of the listener, and two sound transmission channels (a) (b) built into the pad on either side of the support, and each comprising at least one electromagnetic transducer (3a, 3b), especially a loudspeaker, transforming an electrical signal into a sound wave, the pad (20) creating, together with the diaphragm, a substantially hermetic anterior cavity (7a, 7b), and at least one sound duct (4a, 4b) positioned with respect to the transducer, running from a sound wave reception end, emerging in a substantially hermetic manner into the cavity (7a, 7b), to an emission end (42a, 42b), the duct having a flow cross-section whose minimum value is less than the apparent area of the diaphragm of the transducer.

15 Claims, 2 Drawing Sheets

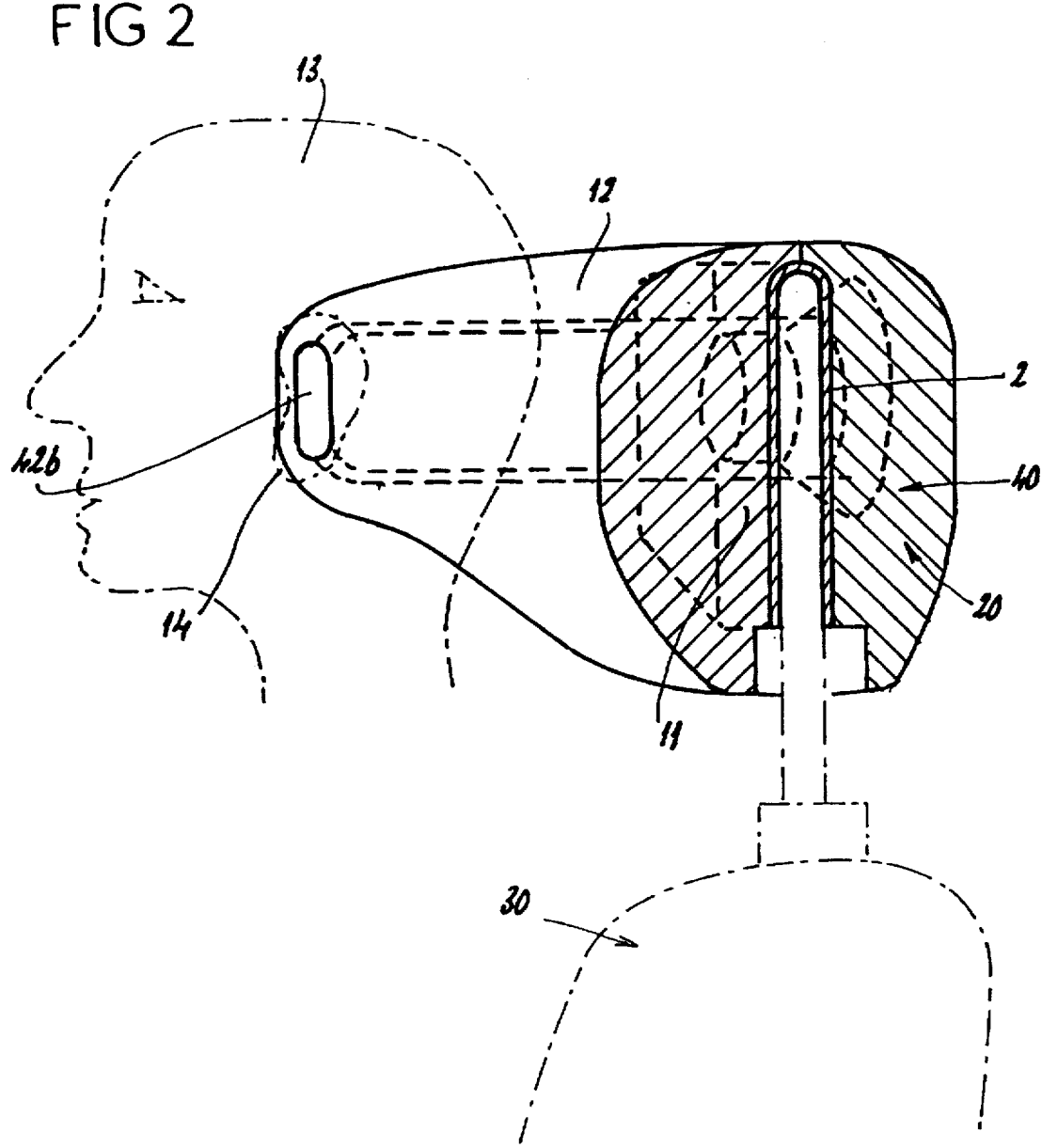

HEADPIECE OR HEADREST COMPRISING A PERSONAL PROXIMITY SOUND RIG

BACKGROUND OF THE INVENTION

1. Field of the Invention

The present invention relates to a headpiece or headrest in relation to the head of a listener, which includes or has built-in a personal proximity sound rig system or assembly.

2. Description of the Prior Art

"Personal proximity sound rig" is understood to mean any solution or means making it possible to replace a conventional audio headset, placed on the ears of a listener. It is, more particularly, a sound emission system, placed in the immediate vicinity of the head of the listener, without necessarily being in contact therewith, and consequently leaving the said head free for any movement.

In accordance with the document, WO-A-9301951, a headpiece or headrest equipped with a personal proximity sound rig has already been described and proposed, and includes:

a rigid and flat support, consisting of a substantially rectangular plate, mounted in an orientable manner on a mount a pad, consisting in essence of a flexible bulk elastic material mounted and enveloping the aforesaid flat support; this pad forms a block of rounded contour arranged solely to the rear of the head of the listener.

Two sound transmission channels are arranged and built into the aforesaid pad, on either side of the flat support, that is to say on the two sides respectively of the latter.

Each sound transmission channel comprises:

an electromagnetic transducer, especially a loudspeaker, transforming an electrical signal into a sound wave, which is fixed on the flat support and includes in the conventional manner at the front a vibratory diaphragm for emitting sound, about an axis and along a direction of emission the pad creating, together with the diaphragm of the transducer, a substantially hermetic anterior cavity a straight sound duct, positioned with respect to the transducer, so as to conduct the sound wave from the anterior cavity, and running for this purpose from a reception end for the said sound wave, emerging in a substantially hermetic manner into the aforesaid cavity, to an emission end pointing towards the rear of the head of the listener; this short duct has a uniform flow cross-section whose value is less than the apparent area of the sound emission diaphragm, viewed on the axis of emission.

Consequently, in accordance with the document WO/A/9301951, with respect to the head of the listener, on the one hand the two transducers or loudspeakers are arranged to the rear, with their sound emission axes parallel to one another and to the mid-plane of the head of the said listener, and on the other hand the direction of sound emission of the two transducers points towards the front of the head of the said listener. In particular, the two sound ducts are straight and substantially parallel to the aforesaid mid-plane of the head of the said listener.

As a consequence, the two emission ends of the two transmission channels respectively are arranged in a plane located some distance and to the rear of the head of the listener, thus precluding optimum sound reproduction, in an outside environment which may perhaps also be noisy. Moreover, sound diffusion is not limited and circumscribes the listener.

In accordance with document US-A-440443, a headpiece or headrest, with a personal proximity sound rig, has been described or proposed which comprises a pad devised so as partly to surround the head of the listener, and for this purpose it includes a central part and two substantially parallel lateral parts, turned back, on either side respectively of the head of the said listener. Two electromagnetic transducers, namely two loudspeakers are arranged directly in the two lateral parts of the pad respectively, substantially in line with and in proximity to the two ears respectively of the listener, without contact with them.

In practice, if it is desired to obtain, in the region of the ears of the listener, sound reproduction with a relatively linear passband over virtually the whole of the sound spectrum, the loudspeakers need to have a vibratory diaphragm with a relatively large apparent area, and hence be of relatively significant size and weight, thus making them impossible to install and build into the pad of the headrest, or even into the seat to which the said headrest belongs.

SUMMARY OF THE INVENTION

The object of the present invention is to remedy all of these drawbacks. More particularly, the subject of the invention is a headpiece or headrest, equipped with a personal proximity sound rig, affording conditions of optimum emission, together with good quality of sound reproduction.

The present invention stems from two arrangements, one cooperating with the other:

on the one hand, the pad of the headpiece or headrest is positioned so as partly to surround the head of the listener, and for this purpose includes a central part and two substantially parallel lateral parts, turned back, respectively on either side of the head of the listener, and on the other hand, the two transducers are arranged in the central part of the headpiece or headrest, whereas the two sound ducts of the two transmission channels respectively run within the two lateral parts, each with a terminal bend so as to bring the two emission ends of the said sound ducts substantially in line with and in proximity to the two ears of the listener, without contact with them.

The present invention makes it possible, in particular to afford the optimum location of the emission points, by using loudspeakers with dimensions sufficient for good quality sound reproduction, and by maintaining the absence of hard materials at the emission points and with relatively small dimensions of the device.

BRIEF DESCRIPTION OF THE DRAWINGS

The present invention is now described with reference to the appended drawing in which:

FIG. 2 represents the same headrest, in a vertical section through its middle.

DETAILED DESCRIPTION OF THE PREFERRED EMBODIMENTS

Figure 1:
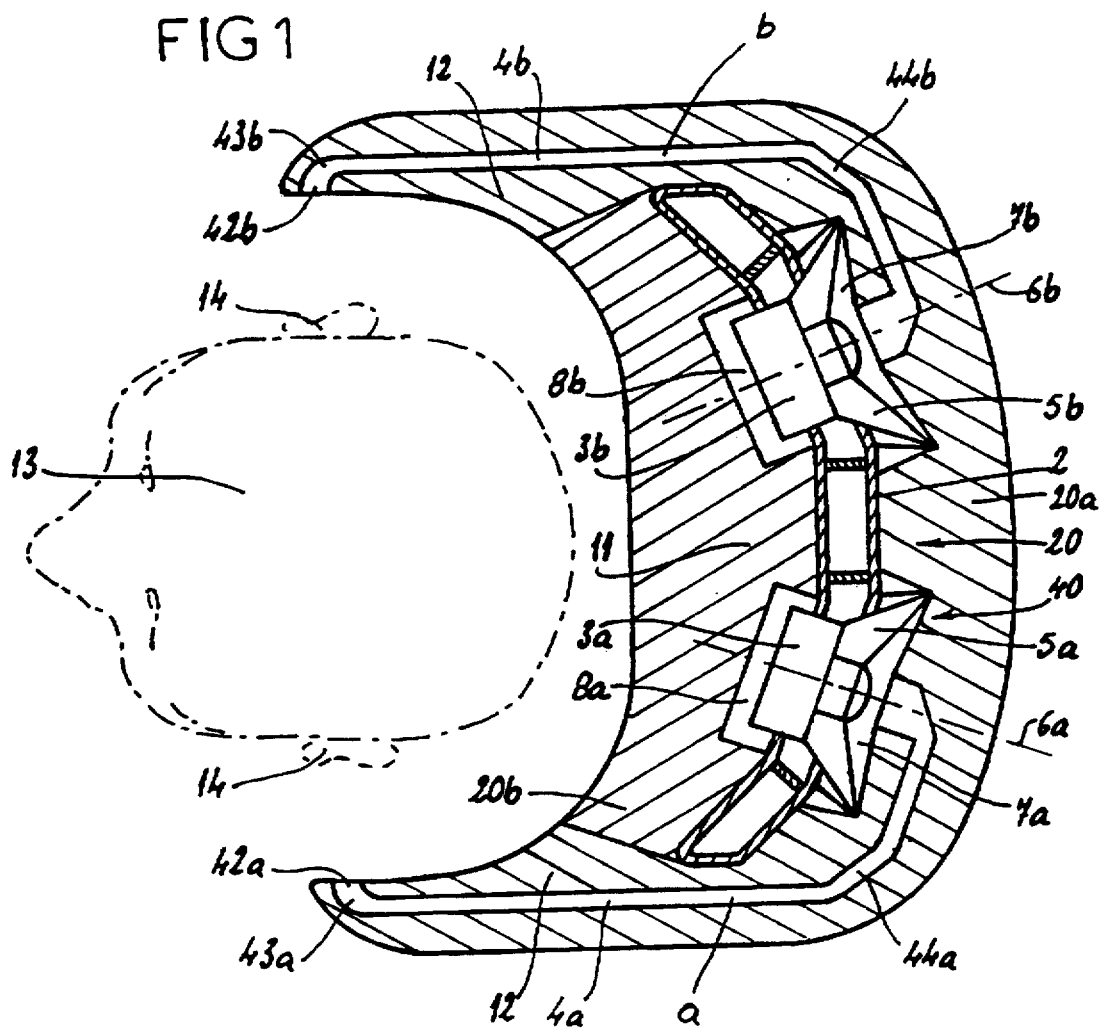
FIG. 1 represents, schematically in horizontal section, a headpiece or headrest according to the present invention

In FIGS. 1 and 2, the head of the listener is represented chain-dotted, as is the main part of the seat to which the headrest according to the invention belongs (FIG. 2).

In accordance with FIGS. 1 and 2, under the numerical references 13 and 14, are represented respectively the head of the listener and his two ears.

The headpiece or headrest (40) according to the invention belongs to or is built into a seat represented schematically by the numerical reference 30. More precisely, this headrest is arranged vertically and above the seat (30) possibly in a manner whereby its height can be adjusted with respect to the latter.

This headpiece or headrest (40), for the head of the listener (13), comprises a rigid support (2), having the shape of a compartmentalized shell, as well as a pad (20), made entirely from a flexible bulk elastic material, for example a synthetic foam, in two complementary parts (20a and 20b), the one fitting into the other, and on to the rigid support (2) to which they are fixed.

As FIG. 1 shows, the pad (20) is positioned so as partly to surround the head of the listener, and includes for this purpose a central part (11) supporting the head of the listener (13) from the rear, and two substantially parallel lateral parts (12), turned back, respectively on either side of the head (13) of the said listener.

The personal proximity sound rig system, built into the headrest (40), comprises two sound transmission channel (a, b), of stereophonic type for example, built into or included within the pad (20).

Each sound transmission channel (a, b) comprises:

at least one electromagnetic transducer (3a, 3b), especially a loudspeaker, transforming an electrical signal into a sound wave, which is fixed on the support and includes in the conventional manner a vibratory diaphragm (5a, 5b) for emitting sound about an axis of emission (6a, 6b).

an anterior cavity (7a, 7b), created directly in the flexible material of the pad 20, which is substantially hermetic with respect to the diaphragm (5a, 5b)

at least one sound duct (4a, 4b), obtained directly in the flexible material of the pad (20), and positioned with respect to the transducer (3a, 3b), running in an overall manner from a sound wave reception end, which emerges in a substantially hermetic manner into the anterior cavity (7a, 7b), to an emission end (42a, 42b).

"Hermetic" is understood to mean any arrangement which confers upon the anterior cavities (7a, 7b), and upon the sound ducts (4a, 4b), with respect to the said cavities respectively, relative or significant tightness in relation to the sound waves transmitted in the two channels (a and b) respectively.

The two transducers (3a, 3b) are arranged in the central part (11) of the headpiece (40), and the two sound ducts (4a, 4b) run within the two lateral parts (12) of the pad (20) respectively, alongside the head of the listener (13), and each with a terminal bend (43a, 43b) so as to bring the two emission ends (42a, 42b) substantially in line with and in proximity to the two ears (14) of the listener (13), without contact with them.

Each sound duct (4a, 4b) has a flow cross-section whose minimum value is less than the apparent area of the corresponding diaphragm (5a, 5b), viewed on the sound emission axis (6a, 6b). This minimum value is at most equal to half of the apparent area of the diaphragm of each transducer (3a, 3b) and preferably between a quarter and a half of the said apparent area.

Preferably, the emission diaphragm (5a, 5b) of each sound transducer (3a, 3b), has an apparent area at least equal to 0.125 dm$^2$, thus making it possible, in cooperation with the previously defined described arrangements to obtain a sound reproduction of good quality in the low registers, and which consequently is virtually linear over a significant part of the sound spectrum.

As FIG. 1 shows, the pad (20) creates two posterior cavities (8a, 8b), in which the transducers (3a, 3b) respectively are arranged in part.

As the sound ducts (4a, 4b) are obtained directly within the flexible bulk elastic material of the pad, on the one hand the emission end (42a, 42b) of each said duct emerges into this same flexible material, thus avoiding injury to the head of the listener in the event of lateral contact with the pad (20), and on the other hand, each sound duct includes at least one interior layer of a flexible and bulk elastic material of the pad, thus making it possible to damp or absorb the unwanted vibrations to which the headrest or headpiece is subjected.

In a manner which is not represented, the two emission ends (42a, 42b) each have a concave profile, the concavity of which is directed towards an ear (14) of the listener (13).

The two emission ends (42a, 42b) of the two sound ducts (4a, 4b) are located on the axis, or slightly off the axis of the two ears (14) of the listener (13).

The two transducers (3a, 3b) have emission axes (6a, 6b) directed similarly to that of the head (13), and correspondingly the sound duct (4a, 4b) of each transmission channel has another bend (44a, 44b) for passage from the rear to the side of the head of the listener.

By way of example, the direction of emission of the two transducers (3a, 3b) points towards the rear of the head of the listener (13).

I claim:

1. Headpiece or headrest for a listener together with a personal proximity sound rig, comprising a rigid support, a pad mounted on said support, with a rest part of said pad for the rear of the head of said listener, and two sound transmission channels built into said pad on either side of the support, and each of said two sound transmission channels comprising:

at least one electromagnetic transducer comprising a loudspeaker for transforming an electrical signal into a sound wave, said loudspeaker is fixed on said support and includes a vibratory diaphragm for emitting sound about an axis of emission;

the pad creating, together with the diaphragm, a substantially hermetic anterior cavity; and at least one sound duct positioned with respect to the transducer, running from a sound wave reception end, emerging in a substantially hermetic manner into said cavity, to an emission end, said duct having a flow cross-section whose minimum value is less than the apparent area of the diaphragm, viewed on the axis of emission, characterized in that the pad is positioned so as partly to surround the head of the listener, and includes a central part and two substantially parallel lateral parts on either side of the head of the listener, the two transducers are arranged in the central part of the headpiece, and the two sound ducts run within the two lateral parts, each of said two sound ducts with a terminal bend so as to bring the two emission ends substantially in line with and in proximity to the two ears of the listener, without contact with the ears of the listener.

2. Headpiece according to claim 1, characterized in that the diaphragm of each of the two sound transducers has an apparent area at least equal to 0.125 dm$^2$.

3. Headpiece according to claim 1, characterized in that the minimum value of the flow cross-section of the sound duct of each of said sound transmission channels is at most equal to half of the apparent area of the diaphragm of each of said transducers.

4. Headpiece according to claim 3, characterized in that the minimum value of the flow cross-section of the sound duct of each of said sound transmission channels is between a quarter and a half of said apparent area.

5. Headpiece according to claim 1, characterized in that, for each of said sound transmission channels, a posterior cavity is created in the pad, in which the transducer is arranged.

6. Headpiece according to claim 1, characterized in that, for each of said sound transmission channels, the emission end of the sound duct emerges into a flexible, bulk elastic material of the pad.

7. Headpiece according to claim 6, characterized in that the flexible, bulk elastic material comprises a synthetic foam.

8. Headpiece according to claim 1, characterized in that, for each of said sound transmission channels, the wall of the sound duct comprises at least one interior layer of a flexible, bulk elastic material of the pad.

9. Headpiece according to claim 1, characterized in that, for each of said sound transmission channels, the emission end has a concave profile, the concavity of the concave profile is directed towards the ears of the listener.

10. Headpiece according to claim 1, characterized in that, the two emission ends of the two sound ducts are located on an axis, or slightly off an axis of the two ears of the listener.

11. Headpiece according to claim 1, characterized in that the axes of emission of the two transducers are directed similarly to the head of the listener, and the sound duct of each of said transmission channels has another bend for passage from the rear to the side of the head of the listener.

12. Headpiece according to claim 11, characterized in that the direction of the axes of emission of the two transducers points towards the rear of the head of the listener.

13. Headpiece according to claim 1, characterized in that the pad is made from a flexible, bulk elastic material in which the two anterior cavities and the two sound ducts are created directly.

14. Headpiece according to claim 1, characterized in that the pad is made in two complementary parts, one fitting into the other, and the pad fitting on to the rigid support.

15. Headpiece according to claim 1 characterized in that the headpiece comprises a personal seat.

* * * * *